4 Sheets—Sheet 1

E. MATHER & G. R. GLEASON.
Machine for Forming Tin-Can Body.

No. 206,031.  Patented July 16, 1878.

WITNESSES:
Forde R. Smith
Adelbert Hamilton

INVENTOR:
Emmett Mather
and George R. Gleason
by Munday & Evarts
attys

4 Sheets—Sheet 2

E. MATHER & G. R. GLEASON.
Machine for Forming Tin-Can Body.

No. 206,031. Patented July 16, 1878.

WITNESSES:
Forde R. Smith
Adelbert Hamilton

INVENTOR:
Emmett Mather
Geo. R. Gleason
by Munday & Evarts
attys

4 Sheets—Sheet 3.

E. MATHER & G. R. GLEASON.
Machine for Forming Tin-Can Body.

No. 206,031.      Patented July 16, 1878.

WITNESSES:
Forde R. Smith
Adelbert Hamilton

INVENTOR:
Emmett Mather
& Geo. R. Gleason
by Munday & Evarts
Attys

4 Sheets—Sheet 4
E. MATHER & G. R. GLEASON.
Machine for Forming Tin-Can Body.
No. 206,031.      Patented July 16, 1878.
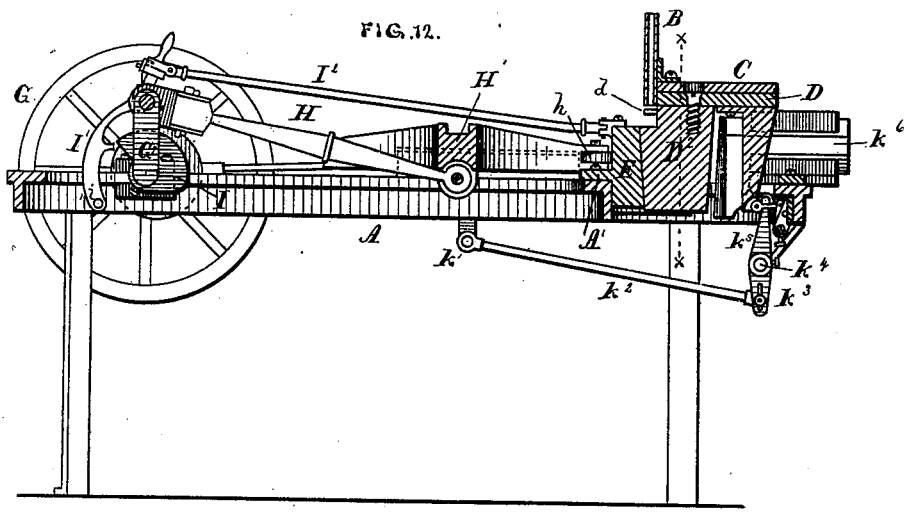
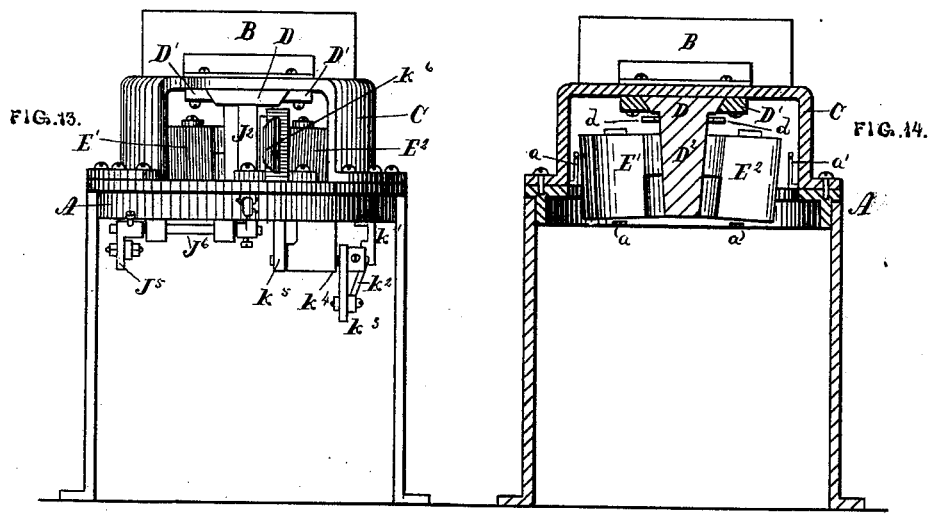
WITNESSES:
Forde R. Smith
James A. Mullen
INVENTOR:
Emmett Mather
and Geo. R. Gleason
by Munday & Evarts
Attys

UNITED STATES PATENT OFFICE.

EMMETT MATHER AND GEORGE R. GLEASON, OF CHICAGO, ILLINOIS, ASSIGNORS TO THE WILSON PACKING COMPANY, OF SAME PLACE.

IMPROVEMENT IN MACHINES FOR FORMING TIN-CAN BODIES.

Specification forming part of Letters Patent No. 206,031, dated July 16, 1878; application filed March 5, 1878.

*To all whom it may concern:*

Be it known that we, EMMETT MATHER and GEORGE R. GLEASON, both of Chicago, in the county of Cook and State of Illinois, have invented certain Improvements in Machines for Forming Tin-Can Bodies, of which the following is a specification:

This invention relates to machinery for giving form or shape to the sides of tin cans; and consists in the construction and in the combination of the several parts and devices hereinafter fully described.

Figure 1:
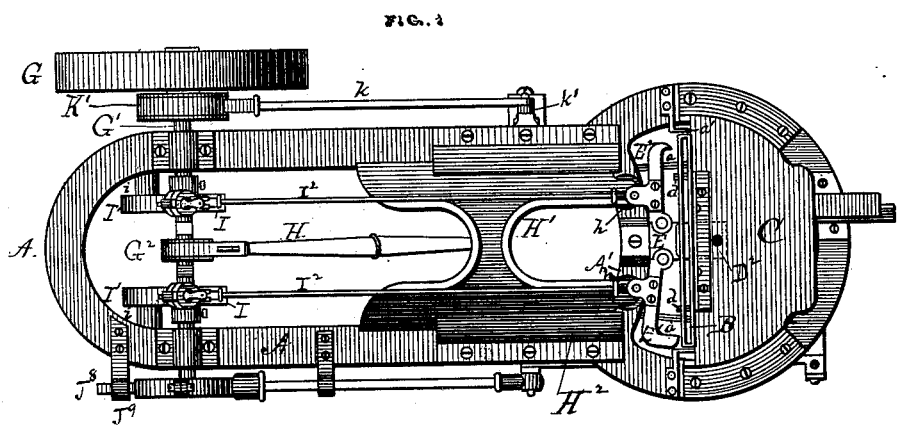
Figure 2:
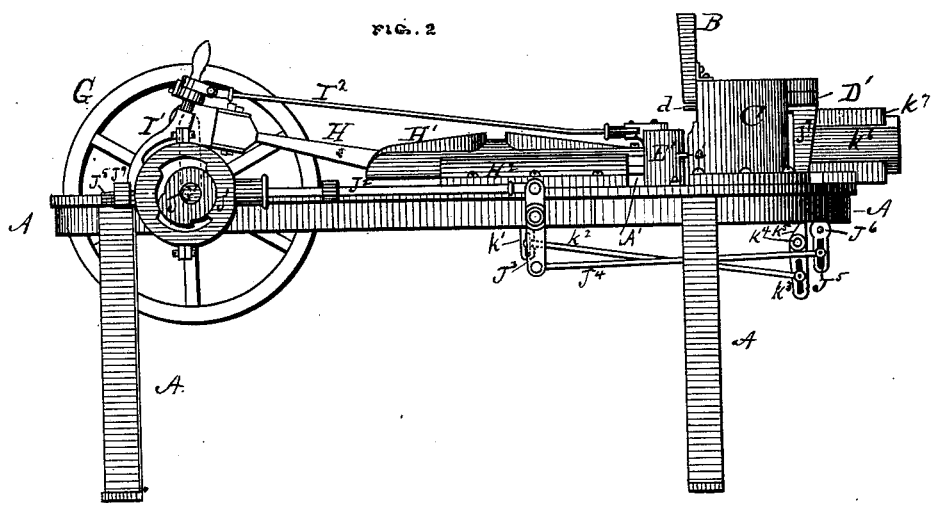
Figure 3:
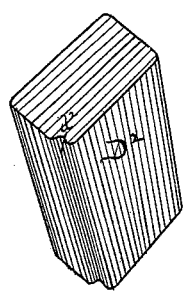
Figure 11:
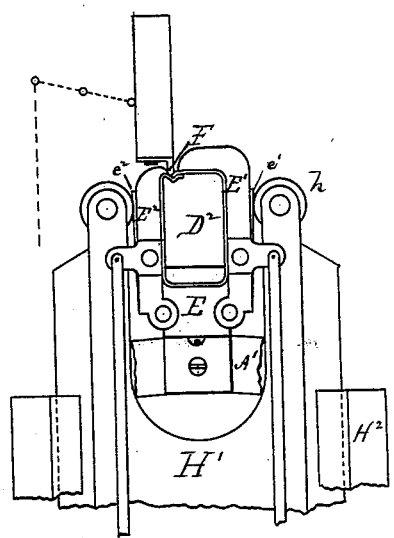
Figure 9:
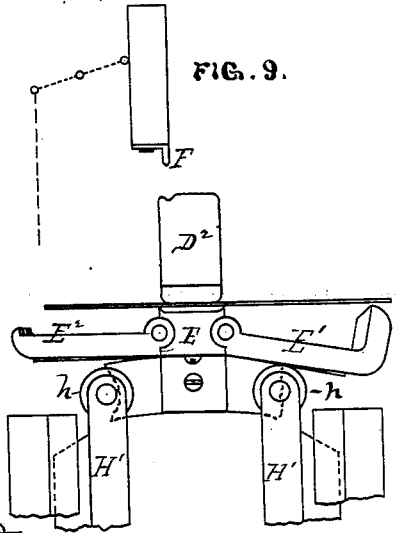
Figure 10:
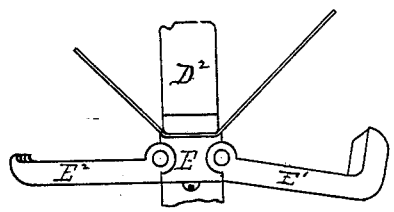

Figure 1 in the accompanying drawing is a plan view of my invention, and Fig. 2 a side view thereof. Figs. 3, 4, 5, 6, 7, and 8 are detail views of parts of the machine. Figs. 9, 10, and 11 show the operation of the machine in various stages of its progress. Fig. 12 is a central longitudinal vertical section of the machine. Fig. 13 is an elevation of the end of the machine containing the forming mechanism, and Fig. 14 is a section thereof upon the line $x$ $x$ of Fig. 12.

Like letters indicate like parts in all the figures in which they are employed.

In said drawing, A represents the frame of the machine and its supports. B is a vertical guide or chute, mounted upon a housing, C, affixed to the frame, through which chute the sheet-metal blanks are fed to the forming mechanism. When placed in this chute the blank falls upon a couple of projecting points, $d$ $d$, and is thereby detained until the preceding blank has been formed and dropped out of the way. These points are attached to a sliding piece, D, which reciprocates upon the inclined faces of the supporting-pieces $D^1$, attached to the under surface of the housing C. The points $d$ may be fastened directly to the former or core-block $D^2$, which is also attached to the slide D, if that is preferred. The core $D^2$ depends from the slide, and at all sides thereof there is an opening, so that the blank may be free to drop therefrom, by its own gravity, after shape has been given it.

When the projections $d$ are withdrawn, the blank drops down into the forming mechanism, and is arrested by other stationary arms, $a$ $a$, extending from the bridge A' of the frame, and it is guided in this descent by guards $a'$ $a'$ at either side. The blank is now in the position shown in Fig. 9, ready for the operation of shaping.

The next step in the operation is the upsetting of the core $D^2$ against the forming-block E stationary upon the bridge A'. By this step the metal is brought to the shape shown in Fig. 10, the projecting lips upon the block E closing upon the rounded corners of the core. The wings $E^1$ $E^2$, both of which are hinged to the block E, are now advanced upon the metal, and they carry or force it entirely around the core, as illustrated by Fig. 11. The seam being formed at the corner of the can, the wings are different, in that one is given a longer L than the other, for reasons sufficiently obvious. In the drawing, the wing $E^1$ is provided with this projection, as it bends the end of the metal which covers the major part of the back face of the forming-core.

The ends of the blank being thus brought together over the groove $d^2$ at the corner of the core, a knife-edge, F, not too sharp nor yet too blunt, is brought to bear against the meeting edges of the blank, and crowds them into the groove, with the effect to be observed in Fig. 11. This completes the shaping operation, and the outer parts F, $E^1$, and $E^2$ being withdrawn, and the core moved back from the block E to the position shown in Fig. 9, the can is no longer held, and falls to the floor.

It now remains to describe the mechanism by which the moving parts of the shaping devices are actuated.

G is a band-wheel, which gives motion to the machine through its shaft $G^1$, which is provided with a crank, $G^2$, at its center, and with cams or eccentrics, as hereinafter specified. Connected with the crank $G^2$ is a pitman, H, which actuates a sliding head, $H^1$, very similar to the sliding heads used in steam-engines, and working in slideways in the pieces $H^2$, upon the frame at either side. At $h$ $h$ in the sliding head are pulleys which, when the head is propelled toward the shaping mechanism, come in contact with the wings $E^1$ $E^2$, or with the raised surfaces $e^1$ $e^2$ on the back thereof, and force them to close around the core, as before described. At each side of the crank $G^2$, upon the shaft $G^1$, is a cam, I, operating each a lever, I¹, pivoted at $i$ upon the frame, and a rod, I², extending from each lever to the wings E¹ E². These cams I and levers I¹ are so constructed and so timed in their operation that they will permit the closing movement of the wings, and will withdraw them preparatory to the shaping of the next blank.

The slide D and the parts it supports are reciprocated by an eccentric, J, upon the end of the shaft G¹ and intervening mechanism, consisting of the ring J¹, rod J², double lever J³, fulcrumed near its center upon the frame, rod J⁴, crank J⁵, shaft J⁶, the latter having at its inner end an upwardly-extending crank, connected to the rigid leg J⁷, depending from the slide, by a link pivoted in both crank and leg. By this construction positive motion is imparted to the slide in both directions. The ring (the construction of which, as well as that of the eccentric, fully appears by Fig. 2) is steadied and supported further by a square projection, J⁸, working in a bearing, J⁹, extending from the frame.

Figure 8:
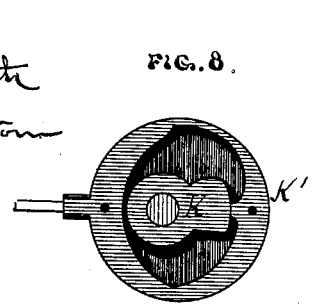

Upon the shaft G¹, adjacent to the band-wheel, is another cam, K, working in an inclosed cam-wheel, K′, the interior construction of which is shown by Fig. 8, as is also that of the cam itself. These parts, through intervening mechanism very similar to that used to convey motion from the eccentric J to the slide D, and consisting of the rod $k$, double lever $k^1$, rod $k^2$, crank $k^3$, shaft $k^4$, oscillating in a bearing attached to the frame, and a crank, $k^5$, attached to an L of a sliding piece, $k^6$, actuate the knife-edge F, which is formed upon or attached to the slide $k^6$. This slide reciprocates in ways formed in the part $k^7$. The cam K and wheel K′ are so timed with reference to the other parts of the machine that they act upon the sliding knife-edge after the wings have closed around, or nearly around, the core, and they withdraw it simultaneously with the withdrawal of the wings.

As before explained, the slide D is moved up to the block E before the wings or the other parts of the forming devices begin their allotted operations.

As will be noticed in the drawing, the rods I² are attached to the levers by means of rings $i^2$. These are removable from the levers for purposes of repair or adjustment, and they are held on by L-shaped pieces $i^3$, one part of which is inserted in a recess in the rings $i^2$, while the other is secured to the collar $i^4$, formed upon the lever by a set-screw, as shown. Handles may also be provided upon the levers, if desired.

Figure 6:
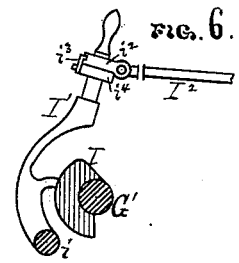
Figure 7:
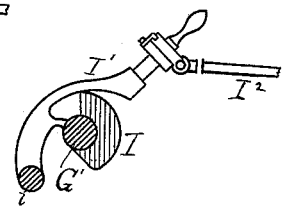

The construction of these levers and of the cams by which they are operated fully appears in Figs. 6 and 7, in the first of which the position occupied before the commencement of the forming operation is given, and in the other the position at the time of completing the same.

The forming devices shown are such as are used in giving shape to pyramidal cans. It will be understood, of course, that our invention is equally applicable in the giving form to cans of other shapes.

Figure 4:
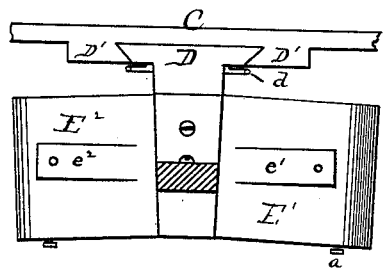
Figure 5:
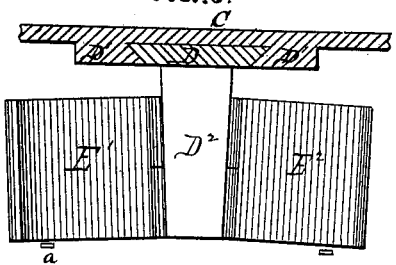

Figs. 4 and 5 are, respectively, back and front views of the block E and the wings E¹ and E², which are hinged to the block E—that is to say, the first view shows the outside, and the latter the inside, of the parts. In Fig. 6 the block E is obscured by the core.

We claim—

1. The machine for bending can-bodies, provided with a vertical core or former of the size and shape of the can to be formed, suspended at the top, and vertical formers for bending the blank around the core, the formers being automatically operated, and sustained at their side, edges, or backs, whereby we are enabled to discharge the blank automatically after it has been shaped.

2. The machine for bending can-bodies, wherein are combined a vertical central core conforming to the shape and size of the can, and suspended at its end, and automatically-operated mechanism for bending the blank around the core, substantially as set forth.

3. In a machine for shaping can-bodies, the combination, with the vertical central core, having a groove at the point where the seam is made, with automatically-operated mechanism for bending the blank around the core, and a knife-edge for pressing the ends of the blank into the groove in the core.

EMMETT MATHER.
GEORGE R. GLEASON.

Witnesses:
JNO. G. LISTON,
J. A. WILSON.